US008984072B2

(12) United States Patent
Sadja et al.

(10) Patent No.: US 8,984,072 B2
(45) Date of Patent: Mar. 17, 2015

(54) SYSTEM AND METHOD FOR PROVIDING RECOMMENDATIONS TO A USER IN A VIEWING SOCIAL NETWORK

(75) Inventors: Aran Sadja, San Diego, CA (US);
Jeffrey Tang, San Diego, CA (US);
Bryan Mihalov, Escondido, CA (US);
Ludovic Douillet, Escondido, CA (US);
Nobukazu Sugiyama, San Diego, CA (US)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 13/108,973

(22) Filed: May 16, 2011

(65) Prior Publication Data

US 2012/0117167 A1 May 10, 2012

Related U.S. Application Data

(60) Provisional application No. 61/411,627, filed on Nov. 9, 2010.

(51) Int. Cl.
*G06F 15/16* (2006.01)
*G06F 17/30* (2006.01)
(Continued)

(52) U.S. Cl.
CPC ............ *G06F 17/3089* (2013.01); *H04L 51/14* (2013.01); *H04L 51/32* (2013.01); *H04L 67/141* (2013.01); *H04L 67/306* (2013.01);
(Continued)

(58) Field of Classification Search
CPC .......... G06F 15/16; G06Q 50/01; H04N 1/21; H04N 7/147; H04N 21/00; H04L 15/588; H04L 9/0827

USPC .......................................................... 709/206
See application file for complete search history.

(56) References Cited

U.S. PATENT DOCUMENTS 5,604,896 A 2/1997 Duxbury et al.
6,219,835 B1 4/2001 House
(Continued)

FOREIGN PATENT DOCUMENTS

CN 101315634 12/2008
CN 101321137 12/2008
(Continued)

OTHER PUBLICATIONS

Douillet et al.: U.S. Appl. No. 13/108,977, filed May 16, 2011.
(Continued)

*Primary Examiner* — Omar Ghowrwal
*Assistant Examiner* — Ellen A Kirillova
(74) *Attorney, Agent, or Firm* — Fitch, Even, Tabin & Flannery LLP

(57) ABSTRACT

Method and systems are provided for initiating communication with a social networking server maintaining user information corresponding to a user, the user information for the user comprising media preferences for the user, one or more connections associated with the user, and media preferences for each of the one or more connections, retrieving at least a portion of the user information for the user from the social networking server and generating a viewing recommendation for the user at least in part based on at least one of the media preferences of the user, and the media preferences of the one or more connections, the viewing recommendation comprising one or more multi-media content.

20 Claims, 9 Drawing Sheets

(51) Int. Cl.
*H04L 12/58* (2006.01)
*H04L 29/08* (2006.01)

(52) U.S. Cl.
CPC .......... *H04L67/2809* (2013.01); *H04L 67/288* (2013.01); *H04L 51/18* (2013.01)
USPC ........................................................ 709/206

(56) References Cited

U.S. PATENT DOCUMENTS

| | | | |
|---|---|---|---|
| 7,165,239 | B2 | 1/2007 | Hejlsberg et al. |
| 7,272,836 | B1 | 9/2007 | Taylor |
| 7,290,267 | B2 | 10/2007 | Brown et al. |
| 7,293,107 | B1 | 11/2007 | Hanson et al. |
| 7,581,231 | B2 | 8/2009 | Smith et al. |
| 7,620,958 | B2 | 11/2009 | Carrell et al. |
| 7,685,132 | B2 | 3/2010 | Hyman |
| 7,725,460 | B2 | 5/2010 | Seitz et al. |
| 7,725,494 | B2 | 5/2010 | Rogers et al. |
| 7,730,216 | B1 | 6/2010 | Issa et al. |
| 7,739,723 | B2 | 6/2010 | Rogers et al. |
| 7,757,250 | B1 | 7/2010 | Horvitz et al. |
| 7,805,533 | B2 | 9/2010 | Burns et al. |
| 7,822,865 | B2 | 10/2010 | Dowling |
| 8,307,395 | B2 | 11/2012 | Issa et al. |
| 8,694,656 | B2 | 4/2014 | Douillet et al. |
| 2002/0059201 | A1 | 5/2002 | Work |
| 2002/0184407 | A1 | 12/2002 | Shell et al. |
| 2003/0014759 | A1 | 1/2003 | Van Stam |
| 2005/0177380 | A1 | 8/2005 | Pritchard et al. |
| 2006/0059260 | A1 | 3/2006 | Kelly et al. |
| 2006/0224446 | A1 | 10/2006 | Fox |
| 2006/0245431 | A1* | 11/2006 | Morris ........................ 370/395.4 |
| 2006/0271959 | A1 | 11/2006 | Jacoby et al. |
| 2007/0011236 | A1 | 1/2007 | Ravula |
| 2007/0220081 | A1 | 9/2007 | Hyman |
| 2008/0091550 | A1* | 4/2008 | Zacarias et al. ................. 705/26 |
| 2008/0119277 | A1 | 5/2008 | Thelen |
| 2008/0126303 | A1 | 5/2008 | Park et al. |
| 2008/0162660 | A1* | 7/2008 | Becker .......................... 709/213 |
| 2008/0183694 | A1 | 7/2008 | Cane et al. |
| 2009/0292814 | A1 | 11/2009 | Ting et al. |
| 2009/0299963 | A1 | 12/2009 | Pippuri |
| 2009/0307345 | A1 | 12/2009 | Carter et al. |
| 2010/0005520 | A1 | 1/2010 | Abbot et al. |
| 2011/0010453 | A1* | 1/2011 | Roy .............................. 709/225 |
| 2011/0066507 | A1* | 3/2011 | Iyer et al. ................... 705/14.66 |
| 2012/0030587 | A1* | 2/2012 | Ketkar .......................... 715/751 |
| 2012/0117144 | A1 | 5/2012 | Douillet et al. |

FOREIGN PATENT DOCUMENTS

| | | |
|---|---|---|
| CN | 101464881 | 6/2009 |
| CN | 101631311 A | 1/2010 |

OTHER PUBLICATIONS

USPTO; Office Action issued in U.S. Appl. No. 13/108,977, mailed Apr. 11, 2013, 26 pages.
USPTO; Notice of Allowance issued in U.S. Appl. No. 13/108,977, mailed Nov. 7, 2013, 10 pages.
USPTO; Notice of Allowance issued in U.S. Appl. No. 13/108,977, mailed Sep. 6, 2013, 12 pages.
Notification of First Office Action for Chinese Patent Application No. 201110317342.2 mailed by the State Intellectual Property Office of the People's Republic of China on Jan. 6, 2014.
Corrected Notice of Allowability from U.S. Appl. No. 13/108,977 mailed Feb. 12, 2014.
Supplemental Notice of Allowability from U.S. Appl. No. 13/108,977 mailed Feb. 26, 2014.
Supplemental Notice of Allowability from U.S. Appl. No. 13/108,977 mailed Mar. 10, 2014.
First Office Action for Chinese Patent Application No. 201110317313.6 mailed by the State Intellectual Property Office of the People's Republic of China on Mar. 5, 2014.

* cited by examiner

SYSTEM AND METHOD FOR PROVIDING RECOMMENDATIONS TO A USER IN A VIEWING SOCIAL NETWORK

This application claims the benefit of U.S. Provisional Application No. 61/411,627, filed Nov. 9, 2010, entitled "Social Networking for Sony Devices" which is incorporated in its entirety herein by reference.

This application relates to U.S. patent application Ser. No. 13/108,977, filed concurrently herewith, of Douillet, et al.; entitled "SYSTEM AND METHOD FOR CREATING A VIEWING SOCIAL NETWORK" which is incorporated herein by reference in its entirety.

BACKGROUND OF THE INVENTION

As consumers face larger catalogues of content from a growing number of providers, the use of traditional mechanisms for navigating and discovering new content becomes increasingly challenging and ineffective. One of the most common and trusted methods that consumers discover new content is by word of mouth. Until now social sharing of media has not been readily accessible on consumer electronics devices.

SUMMARY OF THE INVENTION

In one embodiment, the invention can be characterized as a method comprising initiating communication with a social networking server maintaining user information corresponding to a user, the user information for the user comprising media preferences for the user, one or more connections associated with the user, and media preferences for each of the one or more connections, retrieving at least a portion of the user information for the user from the social networking server and generating a viewing recommendation for the user at least in part based on at least one of the media preferences of the user, and the media preferences of the one or more connections, the viewing recommendation comprising one or more multi-media content.

In one embodiment, the invention can be characterized as a system comprising one or more servers communicatively coupled, each server further communicatively coupled to one or more users operating one or more local devices, wherein at least one of the one or more servers comprises one or more processors for performing steps comprising initiating communication with a social networking server maintaining user information corresponding to a user, the user information for the user comprising media preferences for the user, one or more connections associated with the user, and media preferences for each of the one or more connections, retrieving at least a portion of the user information for the user from the social networking server and generating a viewing recommendation for the user at least in part based on at least one of the media preferences of the user, and the media preferences of the one or more connections, the viewing recommendation comprising one or more multi-media content.

In a further embodiment, the invention may be characterized as a tangible non-transitory computer readable medium storing one or more computer readable programs adapted to cause a processor based system to execute steps comprising initiating communication with a social networking server maintaining user information corresponding to a user, the user information for the user comprising media preferences for the user, one or more connections associated with the user, and media preferences for each of the one or more connections, retrieving at least a portion of the user information for the user from the social networking server and generating a viewing recommendation for the user at least in part based on at least one of the media preferences of the user, and the media preferences of the one or more connections, the viewing recommendation comprising one or more multi-media content.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
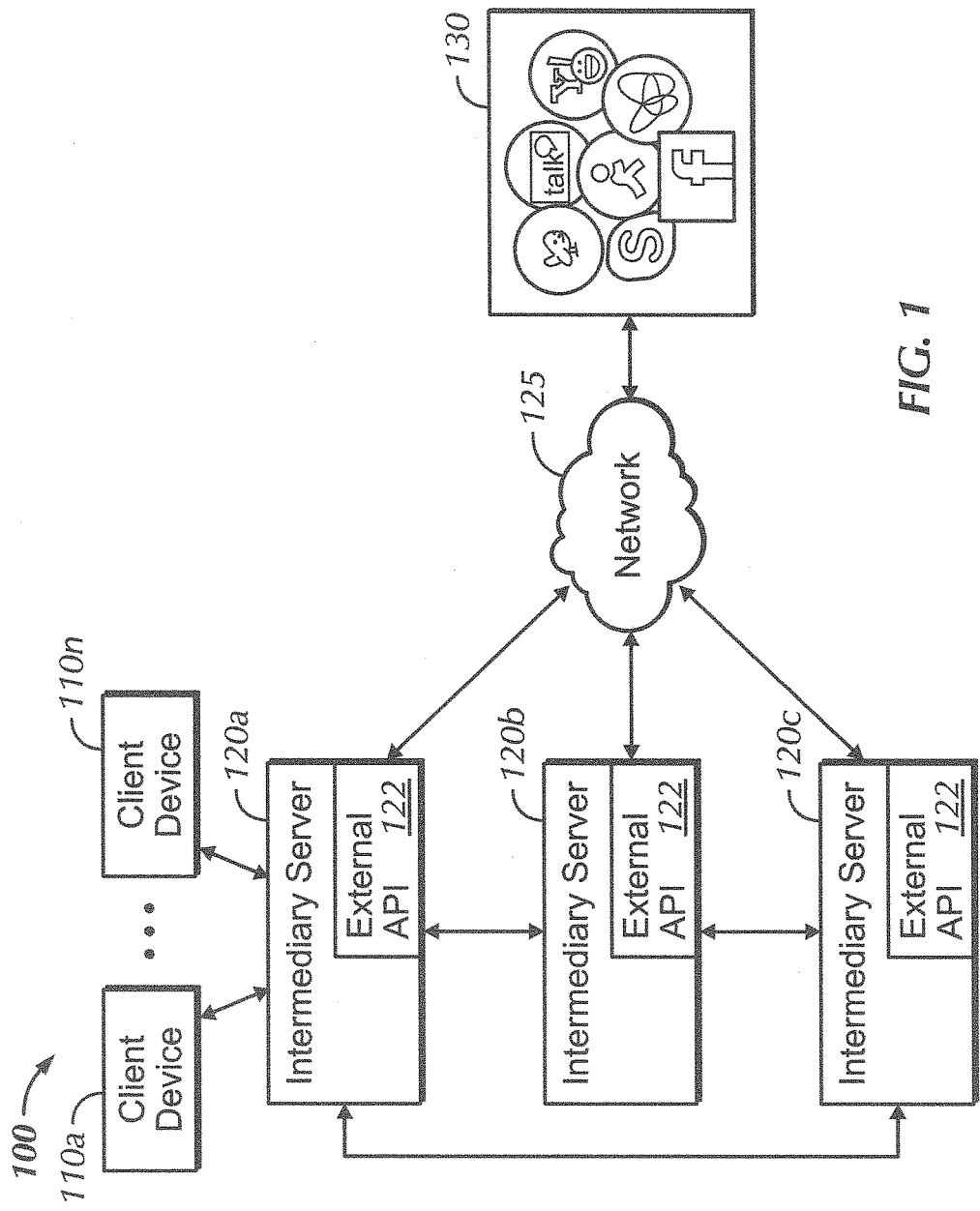
FIG. 1 is an exemplary embodiment of an environment within which the methods and apparatuses of the present application are implemented according to several embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

As consumers face larger catalogues of content from a growing number of providers, the use of traditional mechanisms for navigating and discovering new content becomes increasingly challenging and ineffective. One of the most common and trusted methods that consumers discover new content is by word of mouth. By creating a network of consumers and their devices, according to the embodiments of the present invention, the present system provides a convenient and personalized mechanism for sharing of media preferences and media consumption patterns. Until now, social sharing of media has not been readily accessible on consumer electronics devices. The present invention, in one embodiment, provides methods and techniques for creating a viewing social network accessible at user electronics devices such as televisions, DVD or BluRay players, and other devices.

In many instances, the API for communicating between most social networking clients and social networking servers is updated frequently requiring the client devices executing the social networking clients to update the social networking clients each time the API is updated. In several embodiments, the present invention further provides an intermediary between the social networking client executed on the client device and the social networking server. This intermediary (which may be in the form of an intermediary server executed on an intermediary device) is communicatively coupled to one or more client devices as well as one or more social networking servers and provides the client devices a means for communicating with the social networking server and performing interactions with the social networking server, without the need for updating the social networking client at the client device.

The present invention, in accordance with some embodiments, provides methods and techniques for creating a viewing social network for such client devices, and further provides an infrastructure, users, and most importantly interconnections between users needed to create such viewing social network. In one embodiment, the infrastructure for implementing such viewing social network includes one or more intermediary servers, for example executed on one or more intermediate devices, to communicate with the client devices and one or more social networking servers and to maintain information associated with the viewing social network. In one embodiment, the viewing social network comprises user information for one or more users, as well as connections between the users within the viewing social network.

In one embodiment, the viewing social network comprises a local network of users and their local connections, i.e., affiliated users the user is in communication with or maintains some relationship with similar to friends or connections on Facebook or Linkedin. The viewing social network focuses on creating a social networking environment, which focuses on media consumption preferences, patterns and recommendations and allow interaction between connections, i.e., affiliated users, with respect to media content.

To create the viewing social network, the present invention, in accordance with some embodiments, provides a method to create connections between users within the viewing social network. Creating these connections independently is an onerous task for users, requiring the users to manually create a profile, and enter email addresses, names, and/or other identifier(s) of affiliated users, in order to create connections for the user. This process requires both time in initial preparation, as well as time to create an established profile with a good number of connections, since the connections must be built through other connections, and must allow time for authorization and acceptance by the user on the other side of the relationship.

In several embodiments, the present system provides an automated method of creating a social viewing network for a user by accessing already existing user connections created by the user and maintained and stored by social networking servers such as Facebook, Twitter, Linkedin, and the like. In one embodiment, creating such connections comprises accessing a social networking server having stored therein connection information associated with the user comprising a list of user's connections created at the social networking server, and importing the connection information stored by these social networking servers to create a viewing social network for the user including several local connections. In one embodiment, the local connections of the user are limited to other users within the social viewing network or other users operating client devices communicatively coupled to the intermediary server either directly or through another intermediary server. In several embodiments, the methods and techniques for automated creation of the viewing social network avoids and/or minimizes requiring the user to create another online profile and establish new connections, while allowing the user to quickly have access to connections and information regarding the connections needed to enhance their media consumption experience.

Referring first to FIG. 1, one embodiment of an environment within which the methods and apparatuses of the present application are implemented is illustrated, according to several embodiments of the present invention.

As shown, in one embodiment, the environment comprises one or more client devices 110*a*-110*n* operated by one or more users. In one embodiment, each device within is in communication with an intermediary server 120*a*, 120*b* or 120*c*. In further embodiments, as shown in FIG. 1, the intermediary servers 120*a*, 120*b* and 120*c* are in communication with one or more social networking servers 130 through a network 125.

In one embodiment, the client devices 110*a*-100*n* may comprise entertainment devices, game consoles, home appliances, mobile phones, handheld devices, tablets, personal computers, and/or other consumer electronics devices. For simplicity FIG. 1 only illustrates client devices 110*a*-110*n* coupled to the intermediary server 120*a*. According to several embodiments, each of the intermediary servers 120*a*, 120*b* or 120*c* is communicatively coupled with one or more client devices.

In one embodiment, as shown in FIG. 1, each of the intermediary servers 120*a*, 120*b* and 120*c* is in direct communication with one or more client devices 110 and one or more social networking servers 130. According to several further embodiments, each of the intermediary severs 120*a*, 120*b* and 120*c* is further communicatively coupled to the other intermediary servers as shown in FIG. 1.

For the purpose of describing exemplary embodiments of the present invention the client devices 110*a*-110*n*, as well as other client devices that may be communicatively coupled to intermediary servers 120*a*, 120*b* and 120*c*, and are generally referred to as client device 110. Furthermore, the intermediary servers 120*a*-120*c* are herein referred to generally as the intermediary server 120. However, it should be understood that one or more of the client devices and/or intermediary servers might comprise additional or alternative functionalities, while still functioning according to the embodiments of the present invention. Furthermore, while FIG. 1 only illustrates three intermediary servers 120*a*, 120*b* and 120*c*, in other embodiments the system may comprises any number of intermediary servers, each communicatively coupled to one or more client devices and other intermediary servers, depending on the number of devices, as well as other system characteristics. For example, in one embodiment, the system may be implemented with one intermediary server 120 supporting all of the client devices, while in another embodiment, more than three intermediary servers, communicatively coupled to one another may be employed. It should be understood that the number of intermediary servers 120 is a function of the preferences of the system developers and/or based on system requirements, and that the number of intermediary servers may vary in different implementations of the present invention.

In one or more embodiments, each client device 110 may comprise means for establishing a connection and transmitting and/or receiving content and/or messages from an intermediary server 120, either through a wire and/or through wireless communication. In another embodiment, one or more client devices 110 may be connected to another client device 110 by means such as an HDMI or VGA cord, electrical connection, power network, etc., and may send and receive content and/or messages to and from the intermediary server 120 through the other client device.

In one embodiment, the intermediary servers 120a, 120b, and 120c manage all communication to and from these client devices 110. In another embodiment, one or more client devices may further have a separate, direct communication channel with one or more other client devices in addition to or instead of the communication established through the intermediary server 120. In one embodiment, the client devices 110 may have the capability to discover one another and establish communication with one another. In one embodiment, device discovery may be performed through the server, while in another embodiment the device discovery is performed directly without going through the intermediary server.

Once communication is established between the one or more client devices, the client devices are then capable of performing one or more functionalities including, chatting, voice messaging, presence inquiries and updates, content sharing and synchronization, device control and system messages.

In several embodiments, to provide real time communication between users and their local connections, i.e., connections within the viewing social network, the system may employ various communication protocols and or instant messaging solutions, such as the open XMPP standard, SIP, HTTP polling and/or a proprietary communication protocol, to permit real time peer-to-peer interactions. In one or more embodiments, the system uses a communication protocol allowing for real time and/or persistent communication for sending and receiving communications between the one or more client devices 110. Additionally, in several embodiments, the system may support "push" notifications and update events to provide immediate feedback for actions taken by the user's connections. In one embodiment, the system may employ communication protocols, such as XMPP, SIP, HTTP, or similar communication protocols, and/or a proprietary protocol, to support "push" notifications and update events, and/or to provide immediate feedback for actions taken by the user's connections. In one embodiment, for example, push notifications may be received from the user operating a client device and may be forwarded to one or more other client devices 110 and/or may be provided to a social networking server 130. Push notifications and update events may refer to actions taken by a user at the client device, such as selecting content for viewing. In such embodiments, the update notifications may be used at the social networking server to update the user profile maintained at the social networking server.

In one embodiment, peer-to-peer communication is implemented through a server acting as a proxy to allow users within the viewing social network generated and maintained according to one embodiment of the present invention to communicate with one another, receive viewing recommendations, such as content recommendations, and/or provide updates regarding their viewing habits, i.e., current content being utilized at the client device of the user, history of content utilized at the client device of the user, content preferences of the user, etc., to one another. For example, in one embodiment, the peer-to-peer communication may be implemented through an XMPP, SIP, HTTP, or other such server implementations. In other embodiments, a proprietary communication protocol and/or server implementation may be employed to enable peer-to-peer communication.

Figure 2:
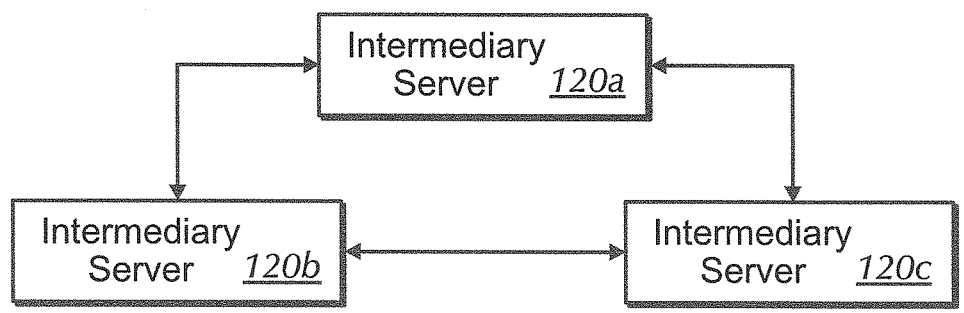
FIG. 2 is an exemplary diagram of the local server implementation, for enabling peer to peer communication, according to several embodiments of the present invention.

FIG. 2 illustrates an exemplary diagram of the local intermediary server implementation, for facilitating peer-to-peer communication between client devices, according to several embodiments of the present invention. In one embodiment, the system comprises one or more intermediary servers 120, e.g., intermediary servers 120a, 120b and 120c, in communication with one another. Each of the intermediary servers 120 acts as the intermediary server for one or more client devices 110, e.g., as shown in FIG. 1, intermediary server 120a acts as an intermediary server for client device 110a-110n. In one embodiment, the one or more intermediary servers 120a, 120b and 120c are configured to facilitate communications between the client devices, and may allow for real time peer-to-peer communication. For example, in one embodiment such communications may be facilitated through a communication protocol such as the XMPP messaging protocol, HTTP polling, SIP messaging protocol or a proprietary communication protocol. In one embodiment, for example, where the communication is implemented through the XMPP protocol, the infrastructure for implementing XMPP communication through the intermediary servers may be based upon an open source customizable XMPP server. In alternative embodiments, other server implementations may be used for implementing XMPP communication through the intermediary server. Furthermore, where other communication protocols are used for facilitating communication, the server implementation may be varied based upon the specific communication protocol used to facilitate communication.

In many instances, where there are more than one intermediary servers within the system, each intermediary server may maintain an open communicational coupling to each other intermediary server in order to quickly and efficiently pass messages from a user operating a client device maintained by a first intermediary server to a user at a second client device communicatively coupled to a second intermediary server. For example, when a first user operating a first client device, coupled to the intermediary server 120a, sends a message to a second user operating a second client device coupled to the intermediary server 120c, the intermediary server 120a must transmit that message to both the intermediary server 120b and the intermediary server 120c in order to find the second client device operated by the second user. According to several embodiments of the present invention, once the second user/second device has been found, the intermediary server 120a will optimize the delivery, by sending all response messages intended for the second device and/or second user directly to intermediary server 120c. This avoids duplication of messages yet allows each server in the cluster to maintain a lookup table of only its directly connected clients, reducing the memory footprint per server and improving the scalability by limiting the traffic on the backend system.

Referring back to FIG. 1, as shown, in one embodiment, the one or more intermediary servers 120 comprises an external API module 122 for communicating with the social networking servers 130 through the network 125. In one embodiment, the external API module 122 is configured to establish communication with one or more of the social networking servers 130 for receiving a list of user's connections, media preferences information regarding users of the social networking site maintained by the social networking server 130, and/or providing updates regarding media consumption of the user to a social networking server 130. In one embodiment, each of the one or more social networking servers 130 maintains information corresponding to a user, i.e., a user operating the client device 110. In one embodiment, the information may comprise one or more of user preferences, user connections, and user connection preferences. In one embodiment, the user preferences and connection preferences comprise preference information regarding types of media content preferred by users of the social networking server, including the user and his/her connections, i.e., friends, members of affiliated groups, etc.

Social networking servers, such as Facebook, Twitter, Mixi, have spent years building connections between users. In most instances, the social networking servers comprise API support, which allows the intermediary servers 120 to communicate with the social networking servers 130 and obtain media preference information regarding the user and their connections maintained at the social networking servers to generate a viewing social network containing local connections, according to the obtained information. By establishing communication with social networking servers, the present system may rapidly create connections between the user and users at other client devices.

In further embodiments, depending on API functionalities supported by the social networking server, the present system may further be able to retrieve information including profile information as well as posts, comments, status updates, etc., maintained at the social networking server, that users share, such as their habits, likes, and dislikes, e.g., favorite TV shows, movies, music, books, etc. According to several embodiments, this retrieved profile information may be employed for instance to create content recommendations for the user within the viewing social network. The content recommendation may for example include TV programming, movies and/or other media content that may be recommended to the user.

For example, in one embodiment, the retrieved information may be used to compare what a user and user's connections, e.g., friends, have indicated as their media preferences, e.g., favorite TV programming/shows, movies, music and or other media content against media content available to be provided to the user, e.g., current TV programming, movies, streaming content, etc. Any matches may then be provided as "content recommendations" for the user operating the client device. In one embodiment, the comparison may comprise determining one or more characteristics of the media content preferences of the user and their connections maintained at social networking servers 130, such as genre, title, actors, artists, etc. These characteristics may be compared against a list of available media content available to the user at the client device to determine similar media content, i.e., matches, and to provide the user with recommendations.

In one embodiment, the content recommendations comprise TV programming, movies, music, video clips, advertisements and/or other media content. Furthermore, in embodiments, the system further enables the user to instantly send specific recommendations to a friend/connection or to all friends/connections within the viewing social network. In additional or alternative embodiments, the user is further able to share what they are currently watching with all of their local connections within the viewing social network. As such, the present system further provides a new method of browsing based on what the user's local connections are currently watching. In one embodiment, for example, such communication may be enabled using a communication protocol such as XMPP, SIP, HTTP, and/or other similar communication protocols allowing for real time and/or persistent communication. In another embodiment, communication may be facilitated using a proprietary communication protocol. In one embodiment, the communication protocol provides for persistent real time communication between the one or more local connections within the viewing social network.

In some embodiments, the system of the present invention provides the user with a more sophisticated media utilization experience, for example, by integrating the content recommendation functionality described above into existing media viewing services such as web based media content providers, which provide streaming content to a user through an internet connection, web browser or through on-demand services. For example, the recommendation functionality described above may be integrated into web based on demand media content provider applications such as Qriocity and Amazon.

In such embodiments, for example, the user at the client device, viewing web based streaming content, may be presented with recommendations based on the media preferences information retrieved from the social networking servers 130 as well as from one or more local connections. For example, media preferences stored at the social networking servers which comprise favorite movies, TV programs, music, etc., may be compared against the streaming content available to the user, and recommendations may be provided to the user. In one embodiment, the comparison may comprise determining one or more characteristics of the media content preferences of the user and their connections available at the social networking servers 130, such as genre, title, actors, artists, etc., and these characteristics may be compared against a list of available media content at the local device operated by the user, to provide the user with recommendations. In one embodiment, the present system thus provides the user at the client device with instant recommendations through information comprising media content preferences information retrieved from the social networking servers 130 and/or from local connections at the viewing social network. In another embodiment, as described above, users may shared the media content they are currently watching with their local connections at the viewing social network. Thus the present system further provides an opportunity for recurring revenue as each user shares what they are watching with their local connections, therefore creating a similar effect as word of mouth media recommendations.

Thus, according to one embodiment, by communication with the existing social networking servers and retrieving existing user connections and preferences information stored within the social networking servers, automated creation of a viewing social network for users operating such client devices can be accomplished through the intermediary servers 120 which supports communication with one or more social networking servers 130 as well as one or more client devices 110. In one embodiment, the intermediary server 120 is configured to query the social networking server 130 for user information and a list of user's connections associated with the user operating a client device 110. In an additional or alternative embodiment, the intermediary server 120 is further configured to provide the social networking server 130 with update data regarding actions taken by the user operating the client device. In yet a further embodiment, the present system allows for push notifications and update events to provide immediate feedback for actions taken by users and user's local connections within the viewing social network.

In one embodiment, the standard HTTP methods of communication are used to enable communication between the intermediary server 120 and the social networking servers 130. In one embodiment, communication between the intermediary server 120 and various social networking servers 130 and retrieving information and/or content preferences information is performed using the HTTP protocol. In one embodiment, the HTTP protocol is used for all communications with the social networking servers 130, such as Facebook, Twitter, and the like. According to several embodiments, each of these social networking servers 130 provides an HTTP based API for accessing the user profile, media preference information and connections their users have created. In one or more embodiments, HTTP based APIs may also be used to indicate to the intermediary server 120 when additional social networking servers 130 are available, such that future social networking servers can be added dynamically to the list of social networking servers 130 and may be accessed to retrieve user related information.

Figure 3:
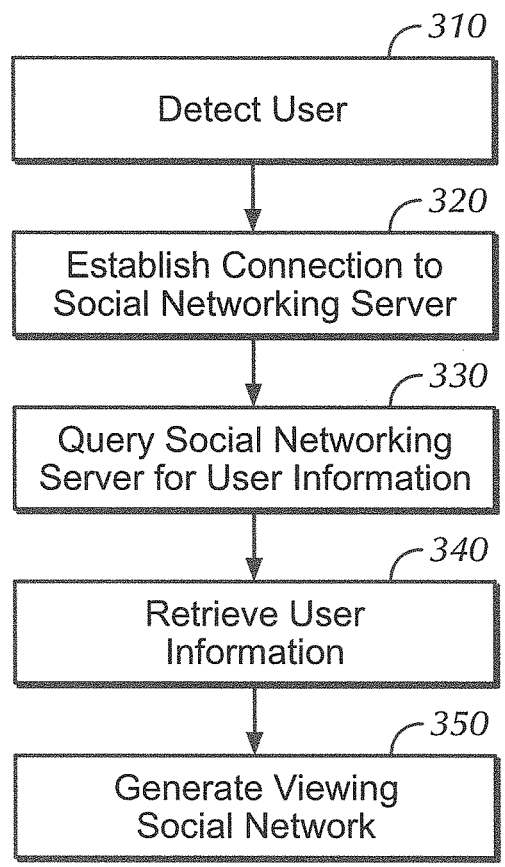
FIG. 3 is a flow diagram of a method for establishing communication to the social networking client and retrieving user data according to several embodiments of the present invention.

Referring to FIG. 3, a flow diagram of a method for establishing communication with the social networking server and retrieving user information is illustrated, according to several embodiments of the present invention.

The method begins in step 310 when the intermediary server 120 detects a first user operating a first client device 110 coupled to the intermediary server 120, wherein the intermediary server 120 is coupled to one or more client devices 110 including the first client device. In one embodiment, for example, a user operating a client device may initialize the process of creating a viewing social network profile, i.e., user profile within the viewing social network. Thus in one embodiment, detecting the user comprises detecting that the user wishes to establish a viewing social network profile. In one embodiment, the request is detected upon the user accessing a web site or menu option associated with the intermediary server and/or the viewing social network.

Upon detecting the user, in step 320, the intermediary server 120 attempts to establish communication with a social networking server 130, maintaining information corresponding to the user. In one embodiment, as described above, the information comprises media preference information and/or user's list of connections maintained at the social networking server 130. In one embodiment, the standard HTTP methods of communication are used to enable communication between the intermediary server 120 and the social networking server 130. In one embodiment, the HTTP protocol is used for some or all of the communications with the social networking servers 130, such as Facebook, Twitter, and the like. Each of social networking servers, according to some embodiments, provides an HTTP-based API for accessing the information and connections their users have entered and/or created.

Figure 4:
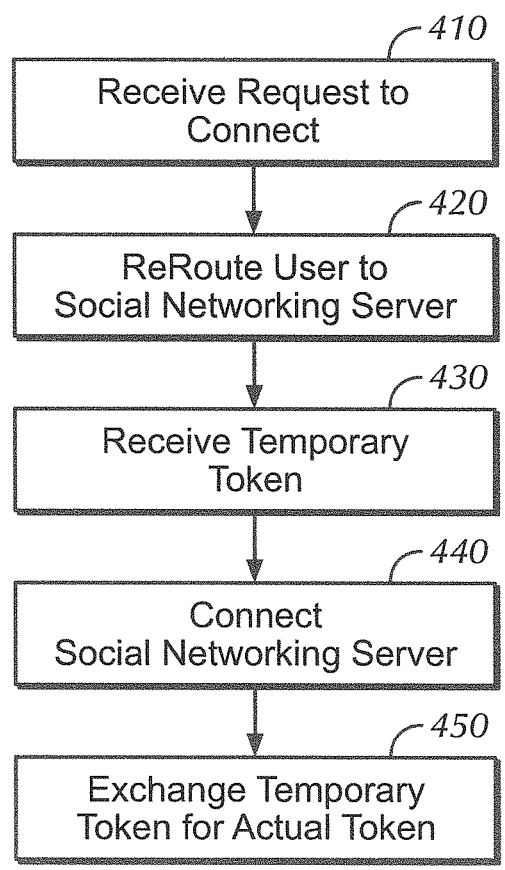
FIG. 4 is a flow diagram of the process for establishing communication with one or more social networking servers according to several embodiments of the present invention.
Figure 5:
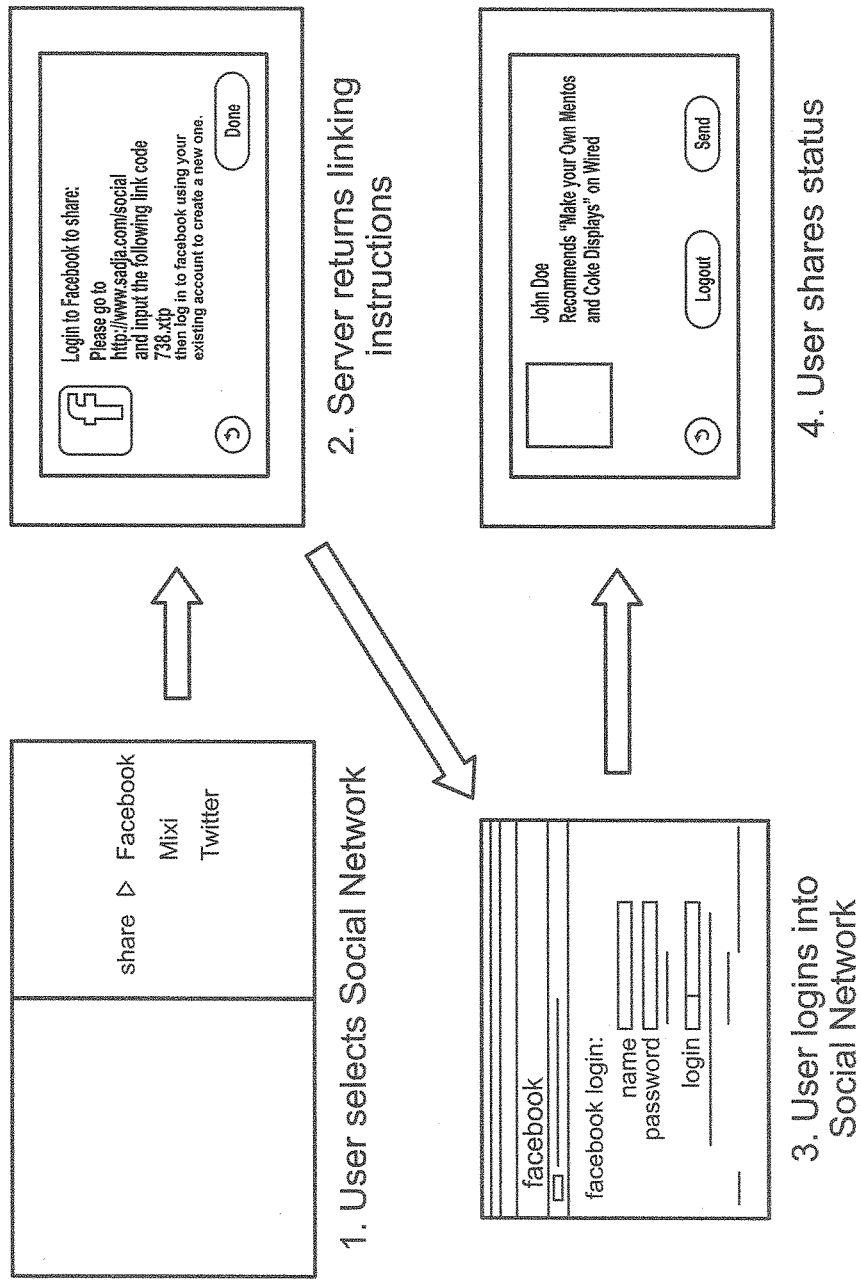
FIG. 5 are exemplary screen shots of the process flow for connecting to the social networking server as it appears to the user according to several embodiments of the present invention.

The process of initially establishing communication with a social networking server is described in further detail with respect to FIGS. 4 and 5. In one embodiment, at the conclusion of step 320, the intermediary server 120 is in direct communication with one or more social networking servers 130 and may send one or more commands, or queries to the social networking clients at the client devices through the external API module 122.

Next, in step 330, the intermediary server 120 queries the social networking server 130 for the information corresponding to the user, i.e., media preferences information and/or a list of user's connections. In one embodiment, the intermediary server 120 is configured to query the social networking server 130 for connection information associated with the user. In one embodiment, for example, the information comprises one or more of user preferences, user connections and user connection preferences. In one embodiment, user connections refer to the user's friends and/or affiliations as maintained at the social networking server 130. According to several embodiments the user preferences and user connection preferences comprise media preferences such as favorite TV programs, movies, music, etc., as well as preferred genres of media.

For example, in some instances, users of social networking sites, maintained by social networking servers 130, indicate favorite movies, music, and TV programs as part of their profile information. In other instances, users may post information to the social networking sites, maintained by the social networking servers 130, such as status updates or comments that indicate a preference for different types of media content. In one embodiment, the social networking servers 130 may collect and store such information and further may provide API functionality such that the intermediary server 120 can retrieve such information.

In one embodiment, the process of querying the social networking server may comprise determining one or more commands supported by API functionality of the social networking server and querying the social networking server by providing the API calls/commands to the social networking server 130.

Next, in step 340, the intermediary server retrieves information corresponding to the user maintained at the social networking server 130 including user information comprising media content preferences. In one embodiment, the information may comprise information retrieved from the user profile maintained at the social networking server 130, including the user's media preferences as well as a list of the user's connections. In one embodiment, the user connections comprise other users of the social networking server interconnected with the user. For example, such connections may comprise friends, group members, users of affiliated pages, etc. Additionally, in many instances, the information further comprises information regarding the user's connections, e.g., friends at the social networking server 130.

In one embodiment, the information regarding the user's connections retrieved from the social networking server 130 comprises information that would typically be available to the user directly through the social networking server 130. For example, the information accessible comprises information that is accessible in view of privacy rules and settings set by users at the social networking server 130. That is, in some embodiments, users of social networking sites, maintained by the social networking servers 130, may set certain restrictions on access to their profile information and the information accessible to their connections. In such embodiments, the information retrieved regarding the user's connections may comprise only the content that the user is authorized to access and view at the social networking sites, as set by the user's connections.

In step 350, using the retrieved information, the intermediary server generates a local viewing social network user profile corresponding to the user. In one embodiment, generating the viewing social network user profile comprises creating at list one or more local connections for the user, and providing interconnections between the user and the one or more local connections. In one embodiment, the generating the user profile may further comprise storing one or more of media preferences of the user, media preferences of the user's connections, and a list of user's connections retrieved from the social networking server 130.

In step 350 the system utilizes the information received from the social networking server 130 and generates a user profile at the local viewing social network for the user. In one embodiment, for example, the information retrieved from the social networking server 130 in step 340 comprises a list of connections of the user at the social networking server 130.

In several embodiments, in step 350 the system may create local connections for the user, and may be configured to establish communication channels between the user and the local connections, such that the user can communicate with his/her local connections. According to one embodiment, the intermediary server 120, upon retrieving a list of the user's connections maintained at the social networking server 130, determines one or more local users of the list of user's connections. In one embodiment, the local users refer to users operating one of the one or more client devices 110 in communication with one of the one or more intermediary servers 120. In such embodiments, the local users are established as local connections for the user within the local viewing social network and the viewing social network user profile may include a list of these local connections.

As described above with respect to FIGS. 1 and 2, local users operating client devices 110 coupled to intermediary servers 120 are capable of communicating with one another either directly or through the intermediary servers 120. Thus, the user may be able to view the one or more local connections and establish communication with these local connections to receive media recommendations and/or current media content utilized at the client devices 110 operated by these local connections. Furthermore, the user may be able to provide updates and recommendations to his/her local connections, regarding the media content being utilized by the user at the client device 110. For example, in one exemplary embodiment, the communication may comprise sending/receiving messages to and from the local connections, e.g., receiving viewing status updates from the local connections, sharing media content with the local connections, receiving media recommendations from the local connections and/or recommending media content to the local connections. In one embodiment, the communication may for example be facilitated through a communication protocol such as for example, XMPP, SIP, HTTP, or a proprietary communication protocol. In one embodiment, the communication protocol allows for real time communication.

In one embodiment, further, the information gathered regarding the user's preferences and user's connection preferences is stored within the user profile. In one embodiment, when generating the viewing social network user profile, at some point, e.g., upon receiving a request from the user, the intermediary server may provide the user with a fillable form to receive basic profile information from the user including identification information, photos, or the like. This information may be further included within the user's viewing social network user profile. The viewing social network user profile may further comprise information such as the user's social networking applications, i.e., social networking servers 130 that the user has authorized or indicated as those the intermediary server 120 should communicate with to retrieve information regarding the user, as well as login information, etc.

Referring next to FIG. 4, a flow diagram of the process for initially establishing communication between an intermediary server 120 and one or more social networking servers 130 is illustrated, according to one embodiment of the present invention.

First, in step 410 the intermediary server 120 receives a user request to establish a user profile within a local viewing social network. For example in one embodiment, the user accesses a website associated with a local viewing social network service provided through the intermediary server 120 or subscribes to the viewing social network service through some menu or other means provided to the user at a client device 110. In another embodiment, the device may detect that a new client device or new user at a client device has coupled to the intermediary server and this detection is understood as a request to establish a viewing social network user profile for all users at the new client device or the new user.

Upon receiving the request the intermediary server 120 determines a list of one or more social networking servers 130 that maintain profiles for the user of the client device 110. For example, in one embodiment, the intermediary server may upon receiving the request query the user for such information and receive the information. In another embodiment, the user may provide such information at the time of requesting to establish a user profile within the local viewing social network.

Upon detecting the request, the process of establishing initial communication between the intermediary server 120 and each of the social networking servers 130 indicated as having a user profile corresponding to the user of the client device 110 begins. In one embodiment, the steps 420-450 is performed for each of the social networking servers 130 indicated as having a user profile corresponding to the user of the client device 110.

According to several embodiments, to initiate communication between the intermediary server 120 and the social networking server 130, first an authentication process must be performed. In many instances the authentication for communication with the social networking servers 130 is performed through an HTTP API interaction. One of the most popular and trusted mechanisms employed by many social networking clients and service providers for performing authentication is OAuth which does not allow a application, such as the intermediary server 120, to directly acquire the users password to access the user's information, e.g., profile and connection information, maintained at the social networking server 130. In such instances, to complete the communication linking process, the user must first login directly at the social networking server's website. Thus, in such embodiments, to establish communication between the intermediary server 120 and the social networking server 130 the user must first visit a website of the social networking server 130 and enter his/her login information.

Thus, in step 420, upon detecting that the user wishes to establish a viewing social network profile, the user is redirected to the social networking server website, e.g., Facebook. Once at the website, the user follows the typical login process at the social networking server site. In such embodiment, the social networking server 130, upon receiving the login request authenticates the user login information. At this stage in the process the linking request from the intermediary server 120 is authenticated and the user is returned to the website associated with the intermediary server 120 with a temporary token. FIG. 5 illustrates exemplary screen shots of the process flow for connecting to the social networking server as it appears to the user.

The temporary token is received in step 430 at the intermediary server 120, and the process continues to step 440. In step 440 the intermediary server 120 directly contacts the social networking server 130. Upon contacting the social networking server, in step 450 the intermediary server 120 signs the temporary token and retrieves an actual token from the intermediary server 120. At the conclusion of the process in step 450 the intermediary server 120 is authenticated and in direct communication with the social networking server 130. Once the communication is established, the intermediary server 120 can query the social networking server 130 via HTTP APIs and request information about the user's profile and information maintained at the social networking server 130.

In one embodiment, once the intermediary server 120 has established communication with each social networking server 130, the intermediary server 120 may store the actual token and can use the token in the future to communicate with the social networking server 130 regarding the information for the user without requiring any further action from the user. In such embodiments, the user only has to complete the login process once for each social networking server 130. In some embodiments, the login process may have to be completed each time the user changes their login information at the social networking server website such that the actual token is no longer valid. In other embodiments, the token may have validity duration, and the user may have to revalidate the communication periodically to update the token.

As described above, these steps are performed for each of one or more social networking servers 130 maintaining information regarding the user at the client device 110.

In one embodiment, upon establishing the communication, the standard HTTP methods of communication are used to enable communication between the intermediary server 120 and the social networking servers 130. In one embodiment, HTTP is used for all communications with the social network servers, such as Facebook, Twitter and any other social networking server 130. According to one embodiment, each of these servers provides an HTTP based API for accessing the connections their users have created which are maintained by these social networking servers.

Figure 6:
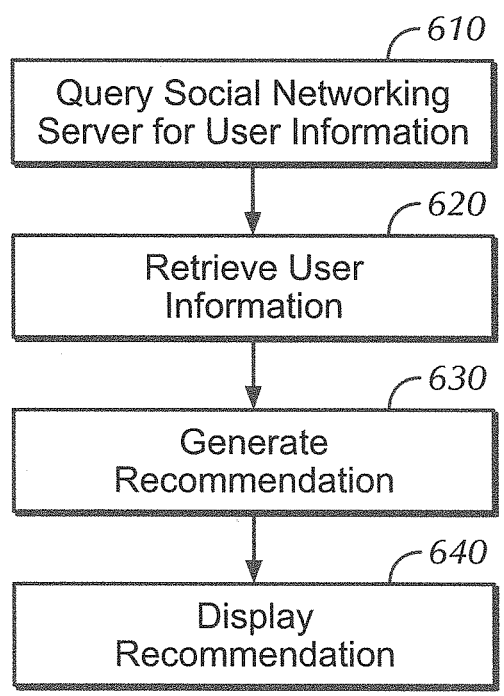
FIG. 6 is a flow diagram of a method for providing user recommendations to a user, according to several embodiments of the present invention.

Referring to FIG. 6, a flow diagram of a method for providing user recommendations to a user is illustrated, according to several embodiments of the present invention.

First, in step 610 the intermediary server 120 communicates with the one or more social networking servers 130 maintaining information regarding the user, and queries the social networking servers 130 for information corresponding to the user. In one embodiment, the user information comprises one or more of media preferences for the user, one or more connections associated with the user, and/or media preferences for each of the one or more connections and other information related to media consumption associated with the user, and maintained at the social networking server 130.

In one embodiment, the intermediary server 120 stores communication information, i.e., a token, to establish direct communication with the social networking servers 130 without any user interaction. For example, in one embodiment, once the intermediary server 120 has completed the steps of establishing initial communication with the social networking servers as described for example in FIGS. 4 and 5, the server stores the necessary information to initiate communication with the social networking servers 130.

In such embodiments, during step 610, the intermediary server 120 retrieves the communication information from storage and establishes communication with the social networking server 130. In one embodiment, the communication information may comprise one or more tokens, cookies, etc. Using the communication information, the intermediary server 120 then initiates communication with the one or more social networking servers 130 maintaining information corresponding to the user.

In one embodiment, once communication is authorized between the intermediary server and the social networking client(s), for example according to FIGS. 4 and 5, initiating the communication comprises contacting the social networking server 130 using the stored communication information and creating a communication port for communication with the social networking server 130, i.e., for sending/receiving information to and from the social networking server 130.

In one embodiment, once the intermediary server is in direct communication with one or more social networking servers 130, it may send one or more commands or queries to the social networking clients through the external API module 122. For example, in one embodiment, the intermediary server may issue one or more API calls to the one or more social networking clients to request media preferences information associated with the user and one or more of the user's connections.

In one embodiment, the system primarily focuses on user preferences and connection preferences in regards to media consumption. As the present system is aimed at creating and maintaining a viewing social network, in one embodiment the user preferences and user connection preferences comprise multi-media preferences. That is, in one embodiment, the intermediary server 120 is configured to access the user profile and/or user profiles of the user's connections maintained at the social networking server 130, as well as other information such as posts and comments maintained at the one or more social networking servers 130 and retrieve information regarding the media preferences of the user and one or more other users affiliated with the user, i.e., user's connections.

In some embodiments, the retrieved information comprises media preferences such as favorite TV shows, movies, music, and other media content that the user or the user's connections have indicated as a preference on their social network profile maintained at the social networking server 130. Further, in some embodiments, either the intermediary server 120 or the social networking server 130 may comprise logic for determining media preferences of a user according to the user's posts, comments or other actions carried out at the social networking site, maintained by the social networking server 130.

Next, in step 620, the intermediary server 120 retrieves the information corresponding to the user from the one or more social networking servers 130. In one embodiment, upon retrieving such information, during step 620, the intermediary server 120 may update the local user profile corresponding to the local viewing social network with the retrieved information. In one embodiment, the update may comprise updating the local connections associated with the user. According to several embodiments, the method of updating the user profile and detecting and creating local connections is similar to the method described above for initially creating the local viewing social network user profile, as described with respect to FIG. 3.

Next, in step 630 the intermediary server 120 generates a viewing recommendation for the user at least in part based on the information retrieved in step 620. In one embodiment, for example, the recommendation is generated based on the media preferences of the user, and the media preferences of one or more of the user's connections. For example, in one embodiment, the retrieved information from the social networking server(s) 130 may be used to compare the user's media preferences and the user's connection's media preferences, against the current multi-media content available to the user, e.g., movies playing or current TV programming. Any matches may then be provided as "recommendations" of what to watch for the user. In one embodiment, the viewing recommendation comprises one or more multi-media content, e.g., TV programs, movies, etc.

For example, in one embodiment, the retrieved information may be used to compare what a user's connections, e.g., friends, have indicated as their preferences, e.g., favorite TV programming, movies, music and or other media content against media content available to be provided to the user, e.g., current TV programming. Any matches may then be provided as "content recommendations" for the user operating the client device. In one embodiment, the comparison may comprise determining one or more characteristics of the media content preferences of the user and their connections, such as genre, title, actors, artists, etc. These characteristics may be compared against a list of available media content to determine similar media content, i.e., matches, and to provide the user with recommendations. In one embodiment, the content recommendations comprise TV programming, movies, audio and/or other media content.

Additionally or alternatively, the recommendation may be based on the information stored at the local user profile and or information or recommendations received from the user's local connections through the viewing social network. In one embodiment, the local user profile may store the current viewing information received from the one or more of the user's local connection. In some embodiments, the local information may include other information such as historical viewing data corresponding to the user, historical viewing habits of the user's local connections, recommendations from the user's connections, filters assigned by the system or user, etc.

Finally, in step 640, the intermediary server 120 provides the viewing recommendation to the user at the client device 110. For example, the recommendations may be provided to the user as a message, may be used to filter the multi-media content received at the user's device, or may be provided in some other manner to the user. Upon receiving the recommendation, the user is able to view the recommendation and select one or more multi-media content for viewing based on the recommendation.

In some embodiments, the intermediary server may upon presenting the user with the recommendations, monitor for content selections at the client device and may provide updates to the social networking servers 130 regarding the user's media related activity. The process of providing updates to the social networking server is further described in detail below with respect to FIG. 8.

Figure 7:
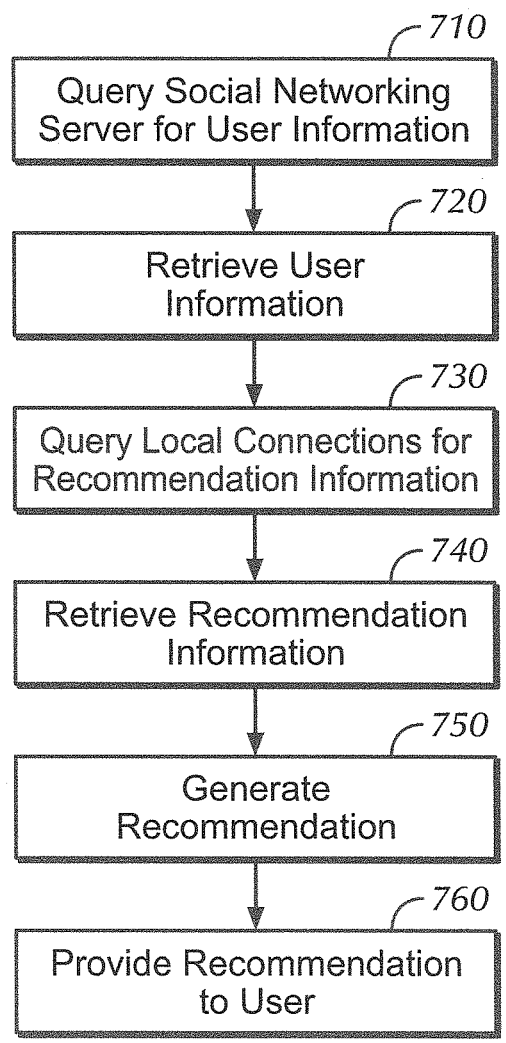
FIG. 7 is a flow diagram of an alternative method for providing user recommendations to a user, according to several embodiments of the present invention.

FIG. 7 illustrates a flow diagram of an alternative method for providing user recommendations to a user, according to several embodiments of the present invention.

First, in step 710 the intermediary server 120 communicates with the one or more social networking servers 130 and queries the social networking servers 130 for media preference information corresponding to the user. In one embodiment, the information comprises one or more of media preferences for the user, one or more connections associated with the user, media preferences for each of the one or more connections and other information related to media consumption of the user.

In one embodiment, the intermediary server 120 establishes communication with the social networking server, e.g., using communication information such as tokens stored at the intermediary server, and sends one or more commands or queries to the social networking servers 130 through the external API module 122. For example, in one embodiment, the intermediary server 120 may issue one or more API calls to the one or more social networking servers 130 to request the information.

Next, in step 720, the intermediary server 120 retrieves the information comprising media preferences from the one or more social networking servers 130. As discussed above, the information may comprise media preferences of the user as well media preferences of the one or more of the user's connections, e.g., friends, affiliations, groups, etc.

Next, according to one or more embodiments, in step 730 the intermediary server 120 further queries the one or more users identified as local connections of the user within the viewing social network maintained by the one or more intermediary servers 120, for recommendation information, comprising media currently being viewed at the client devices operated by the local connection and/or media recommendations from the one or more local connections.

In one embodiment, the intermediary server 120 queries the local connections for such recommendation information either by directly communicating with the client device and/or by communicating with the intermediary server maintaining the client device associated with the local connection, as described in FIG. 3. In one embodiment, the intermediary server 120 may maintain a persistent communication with the one or more other intermediary servers and/or client devices associated with the local connections, and initiate a communication to query the one or more local connections for the recommendation information. In one embodiment, the recommendation data comprises one or more of current media being viewed by the local connection, local media preferences associated with the local connection and specific media recommendations by the local connection, etc.

In response to the query, in step 740 the intermediary server receives the recommendation information from the one or more local connections.

Next, in step 750 the intermediary server 120 generates a viewing recommendation for the user at least in part based on the information received in steps 720 and/or 730. In one embodiment, for example, the recommendation is generated based on the media preferences of the user, and the media preferences of one or more of the user's connections, including the user's connections at the social networking servers 130 as well as the user's local connections on the local viewing social network. For example, in one embodiment, the retrieved information from the social networking server(s) 130 as well as the recommendation information received from the one or more local connections may be used to compare the user's media preferences and the user's connection preferences, i.e., both connections at the social networking server and local connections at the viewing social network, against the current multi-media content available to the user, e.g., movies playing or current TV programming. Any matches may then be provided as "recommendations" of media contents for the user. In one embodiment, the viewing recommendation comprises one or more multi-media content, e.g., TV programs, movies, etc.

Finally, in step 760, the system provides the media recommendation to the user. For example, the recommendations may be provided to the user as a message, may be used to filter the multi-media content received at the user's device, or may be provided in some other manner to the user. Upon receiving the recommendation in one embodiment, the user is able to view the recommendation and select one or more multi-media content for viewing based on the recommendation.

In one or more embodiments, the server is further configured to provide the social networking servers 130 and/or user's local connections with update data regarding media related actions taken by the user at the client device 110 operated by the user. In several embodiments, the present system allows for push notifications and events to provide immediate feedback for actions taken by users and user connections. As described above, the intermediary server 120 maintains a persistent connection with the client device in several embodiments. As such, according to several embodiments, the intermediary server 120 is configured to detect an update event comprising one or more of actions taken at the client device, changes to the local social networking user profile, user recommendations, user viewing habits, user connections, and/or other user actions or data related to the viewing social network.

Figure 8:
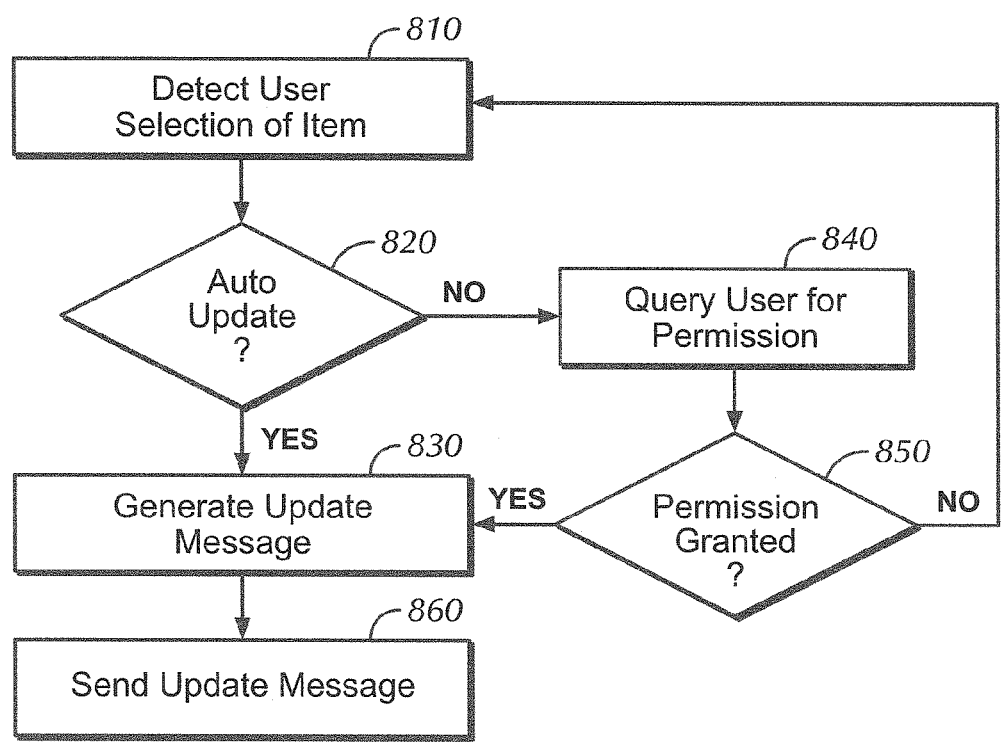
FIG. 8 is a flow diagram of a method for providing updates and push notifications regarding a user's activity at the local viewing social network to one or more local connections and/or to the social networking server, according to several embodiments of the present invention.

FIG. 8 illustrates a flow diagram of a method for providing updates and push notifications regarding a user's activity at the local viewing social network to one or more local connections and/or to the social networking server.

In step 810, the intermediary server 120 coupled to the client device 110 detects an update event. In one embodiment, the update event comprises user multi-media consumption. For example, in one embodiment, the update event comprises a user selection of media content for viewing. In one embodiment, the selection is of one or more of the content recommended to the user. In one embodiment, the intermediary server 120 may monitor the client device 110 and automatically detect update events. In another embodiment, the client device may issue a message to the intermediary server either each time an action is taken or periodically. In one embodiment, the intermediary server upon detecting new update events and/or at specific time intervals determines that an update event is available for updating the social networking servers and/or one or more of the user's local connections within the viewing social network.

Upon detecting the update event, in step 820, the intermediary server, according to one embodiment, determines whether the user wishes to send updates to the social networking server and/or to user's local connections. That is in one or more embodiments, the decision to send updates is left up to the user. In one embodiment, the authorization to send updates may be given on a case by case basis, according to the type of action detected or given for all actions taken, or according to whether the updates are being sent out to the social networking servers 130 or to the user's local connections.

In one embodiment, in step 820 the intermediary server determines whether the user has authorized automatic updates. In one embodiment, automatic updates authorize the intermediary server 120 to automatically send updates to the social networking servers 130 and/or the user's local connections without querying the user on a case-by-case basis. In one embodiment, the automatic update authorization may have been activated by the user for all activities and/or the specific type of media consumption activity, and/or for one or both the social networking servers 130 and/or local connections.

If it is determined that the user has authorized automatic updates for either of the social networking servers and/or the user's local connections, then the process continues to step 830 and the intermediary server 120 generates an update message directed to the authorized recipient. In one embodiment, the update message comprises information about the media consumption activity performed at the client device 110. In one embodiment, a separate update message is generated depending on whether the update is being sent to a local connection or being sent to the social networking servers 130. For example, in one embodiment, the messages being sent to the social networking servers 130 are generated according to a different communication protocol than those generated for local connections. In one embodiment, the update messages intended for the local connections is implemented according to the XMPP protocol, while update messages sent to social networking servers 130 may be implemented according to the HTML protocol. In one embodiment, where the update message is intended for the one or more social networking servers 130, the message may further comprise one or more API calls for causing the social networking servers to receive the data and update the profile associated with the user. In another embodiment, the information included within the message may further vary depending on whether the update message is intended for a social networking server 130 or for a local connection.

If on the other hand in step 820 it is determined that the user has not selected the automatic update option for one or more intended recipients, i.e., either one or both the one or more local connections or one or more social networking servers and/or the type of activity performed at the client device, in step 840 the intermediary server 120 queries the user for permission to send updates. In one embodiment, the user may for example be provided with a notification that an update event has been detected and can grant permission to update the social networking server and/or one or more local connections. In another embodiment, the user can select to view the specific actions that have been detected and can select the specific actions to be provided as an update message.

In step 850 the system determines whether the user has granted permission. If it is determined that the user does not wish to send the update, i.e., no permission was granted, then the process returns to step 810 and begins monitoring for new update events. Otherwise, when the user grants permission to send the update event, the process continues to step 830 where the update message is generated as described above.

Once the update message is generated, in step 860 the update message is forwarded to the intended recipients, i.e., one or more social networking servers 130 and/or one or more of the user's local connections.

In addition to methods for enabling communication, the present system further comprises means for managing and storing the retrieved information associated with the user such as account data, i.e., device profile or user profile data, offline messages, and preferences. In one embodiment, for example, the open MySQL database server may be employed to provide for storage and maintenance of the information associated with the viewing social network.

To store all information for the users of the client devices and their connections, the MySQL Cluster system is employed in several embodiments, which allows for synchronous data transmission between nodes in the MySQL cluster. The benefit of the MySQL Cluster implementation is that it allows for nearly unlimited storage with the added benefit of redundancy. In a MySQL Cluster, memory available is shared across all nodes and each node maintains its own memory space as well as a mirror of another node's data. This comes at the cost of reducing the overall storage per server node but provides the flexibility and reliability needed by a production system. For example, a cluster of 4 servers with 100 GB of storage would have an approximate total redundant storage space of 200 GB, with compression techniques the efficiency of that storage increases while the redundancy and availability remains the same.

While the present invention is described with respect to social networking servers, it should be understood by one of ordinary skill in the art that the methods and techniques described above are applicable to all web based applications and/or servers maintaining information regarding media preference and or maintaining user connections for a user operating a client device 110.

Figure 9:
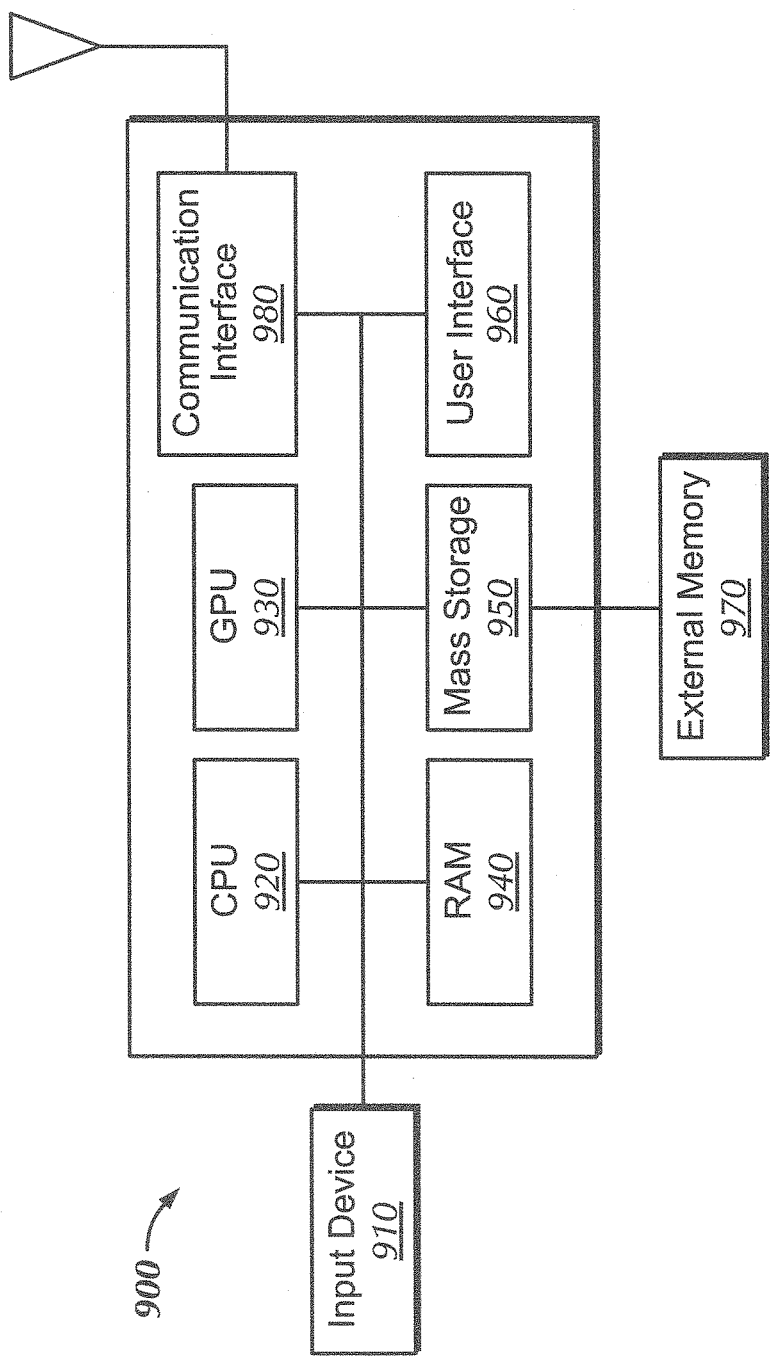
FIG. 9 is a block diagram illustrating a processor-based system that may be used to run, implement and/or execute the methods and/or techniques shown and described herein in accordance with embodiments of the present invention.

The methods and techniques described herein may be utilized, implemented and/or run on many different types of systems. Referring to FIG. 9, there is illustrated a system 900 that may be used for any such implementations. One or more components of the system 900 may be used for implementing any system or device mentioned above, such as, for example, any of the above-mentioned devices, applications, servers, databases, etc. However, the use of the system 900 or any portion thereof is certainly not required.

By way of example, the system 900 may comprise a User Input Device 910, a Central Processing Unit (CPU) 920, a Graphic Processing Unit (GPU) 930, a Random Access Memory (RAM) 940, a mass storage 950, such as a disk drive, a user interface 960 such as a display, External Memory/Removable Storage Device 970, and Communication Interface 980. The CPU 920 and/or GPU 930 may be used to execute or assist in executing the steps of the methods and techniques described herein, and various program content, images, games, simulations, representations, communities, interfaces, etc., may be rendered on the user interface 960. The system 900 may further comprise a user input device 910. The user input device may comprise any user input device such a keyboard, mouse, touch pad, game controller, etc. Furthermore, the system 900 may comprise a communication interface 980 such as a communication port for establishing a communication with one or more other processor-based systems and receiving one or more content. In one embodiment, the communication interface 980 may further comprise a transmitter for transmitting content, messages, or other types of data to one or more systems such as external devices, applications and/or servers. The system 900 comprises an example of a processor-based system.

The mass storage unit 950 may include or comprise any type of computer readable storage or recording medium or media. The computer readable storage or recording medium or media may be fixed in the mass storage unit 950, or the mass storage unit 950 may optionally include external memory and/or removable storage media 970, such as a digital video disk (DVD), Blu-ray disc, compact disk (CD), USB storage device, floppy disk, or other media. By way of example, the mass storage unit 950 may comprise a disk drive, a hard disk drive, flash memory device, USB storage device, Blu-ray disc drive, DVD drive, CD drive, floppy disk drive, etc. The mass storage unit 950 or external memory/removable storage media 970 may be used for storing code that implements the methods and techniques described herein.

Thus, external memory and/or removable storage media 970 may optionally be used with the mass storage unit 950, which may be used for storing code that implements the methods and techniques described herein, such as code for generating and storing the tag data described above, performing the initiation of a session, evaluating, and matching of the users. However, any of the storage devices, such as the RAM 940 or mass storage unit 950, may be used for storing such code. For example, any of such storage devices may serve as a tangible computer storage medium for embodying a computer program for causing a console, system, computer, or other processor based system to execute or perform the steps of any of the methods, code, and/or techniques described herein. Furthermore, any of the storage devices, such as the RAM 940, mass storage unit 950 and/or external memory/removable storage device 970, may be used for storing any needed database(s), tables, content, etc.

In some embodiments, one or more of the embodiments, methods, approaches, and/or techniques described above may be implemented in a computer program executable by a processor-based system. By way of example, such processor based system may comprise the processor based system 900, or a computer, entertainment system, game console, graphics workstation, etc. Such computer program may be used for executing various steps and/or features of the above-described methods and/or techniques. That is, the computer program may be adapted to cause or configure a processor-based system to execute and achieve the functions described above. As another example, such computer program may be used for implementing any type of tool or similar utility that uses any one or more of the above described embodiments, methods, approaches, and/or techniques. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer-readable storage medium storing a computer program for use with a computer simulation, the computer program adapted to cause a processor based system to execute steps comprising initiating communication with a social networking server maintaining user information corresponding to a user, the user information for the user comprising media preferences for the user, one or more connections associated with the user, and media preferences for each of the one or more connections, retrieving at least a portion of the user information for the user from the social networking server and generating a viewing recommendation for the user at least in part based on at least one of the media preferences of the user, and the media preferences of the one or more connections, the viewing recommendation comprising one or more multi-media content.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method comprising:
   initiating communication with a social networking server maintaining user information corresponding to a user, the user information for the user comprising media preferences for the user, one or more connections associated with the user, and media preferences for each of the one or more connections;
   retrieving, at a first intermediary server, at least a portion of the user information for the user from the social networking server;
   generating a viewing recommendation for the user at least in part based on at least one of the media preferences of the user, and the media preferences of the one or more connections, the viewing recommendation comprising one or more multi-media content; and
   facilitating a peer-to-peer connection between a first client device associated with the user and a second client device associated with one of the one or more connection for real-time communication between the first client device and the second client device;
   wherein the generating of the viewing recommendation is further based on data received through the peer-to-peer connection;
   wherein the first intermediary server maintains a lookup table of only a first set of client devices directly connected to the first intermediary server;
   wherein the first intermediary server maintains an open communicational coupling to a second intermediary server which maintains a lookup table of only a second set of client devices connected to the second intermediary server, separate from the first set of client devices;
   wherein the lookup table maintained on the first intermediary server allows the first intermediary server to send a message for a receiving client device directly to an intermediary server directly connected to the receiving client device; and
   wherein the first and second intermediary server each comprises a separate Application Programming Interface (API) module for communicating with the social networking server.

2. The method of claim 1, further comprising providing the viewing recommendation to the user.

3. The method of claim 1, further comprising receiving a selection of one or the one or more multi-media content and generating an update message for the social networking server updating the social networking server with respect to the selection.

4. The method of claim 3, further comprising:
   determining whether the user has authorized updating the social networking server; and
   sending the update message to the social networking server.

5. The method of claim 4, further comprising:
   querying the user for authorization when it is determined that the user has not authorized updating the social networking server; and
   sending the update message when the authorization is received.

6. The method of claim 1, further comprising:
   detecting at least one local connection of the one or more connections, wherein the at least one local connection comprises a user operating a local client device; and
   establishing a local connection between the user and the at least one local connection.

7. The method of claim 6, further comprising:
   querying the at least one local connection for recommendation data, wherein the recommendation data comprises one of current media being viewed by the at least one local connection, local media preferences associated with the local connection and specific media recommendations by the local connection;
   receiving the recommendation data.

8. The method of claim 7, wherein the viewing recommendation is at least in part based on the recommendation data.

9. The method of claim 6, further comprising displaying the at least one local connection and current media currently being viewed by the at least one local connection to the user.

10. The method of claim 6, further comprising receiving a selection of one or the one or more multi-media content and sending an update message to the at least one local connection regarding the selection of the one or more multi-media content.

11. A system comprising:
    one or more intermediary servers communicatively coupled, each server further communicatively coupled to one or more users operating one or more local devices;
    wherein at least one of the one or more servers comprises one or more processors for performing steps comprising:
    initiating communication with a social networking server maintaining user information corresponding to a user, the user information for the user comprising media preferences for the user, one or more connections associated with the user, and media preferences for each of the one or more connections;

retrieving, at a first intermediary server, at least a portion of the user information for the user from the social networking server;

generating a viewing recommendation for the user at least in part based on at least one of the media preferences of the user, and the media preferences of the one or more connections, the viewing recommendation comprising one or more multi-media content; and facilitating a peer-to-peer connection between a first client device associated with the user and a second client device associated with one of the one or more connection for real-time communication between the first client device and the second client device;

wherein the generating of the viewing recommendation is further based on data received through the peer-to-peer connection;

wherein the first intermediary server maintains a lookup table of only a first set of client devices directly connected to the first intermediary server;

wherein the first intermediary server maintains an open communicational coupling to a second intermediary server which maintains a lookup table of only a second set of client devices connected to the second intermediary server, separate from the first set of client devices;

wherein the lookup table maintained on the first intermediary server allows the first intermediary server to send a message for a receiving client device directly to an intermediary server directly connected to the receiving client device; and wherein the first and second intermediary server each comprises a separate Application Programming Interface (API) module for communicating with the social networking server.

12. The system of claim 11, the steps further comprising providing the viewing recommendation to the user.

13. The system of claim 11, the steps further comprising receiving a selection of one or the one or more multi-media content and generating an update message for the social networking server updating the social networking server with respect to the selection.

14. The system of claim 13, the steps further comprising:
determining whether the user has authorized updating the social networking server; and
sending the update message to the social networking server.

15. The system of claim 14, the steps further comprising:
querying the user for authorization when it is determined that the user has not authorized updating the social networking server; and
sending the update message when the authorization is received.

16. The system of claim 11, the steps further comprising:
detecting at least one local connection of the one or more connections, wherein the at least one local connection comprises a first user of the one or more users operating the one or more local devices; and
establishing a local connection between the user and the at least one local connection.

17. The system of claim 16, the steps further comprising:
querying the at least one local connection for recommendation data, wherein the recommendation data comprises one of current media being viewed by the at least one local connection, local media preferences associated with the at least one local connection and specific media recommendations by the at least one local connection;
receiving the recommendation data.

18. The system of claim 17, wherein the viewing recommendation is at least in part based on the recommendation data.

19. The system of claim 16, further comprising receiving a selection of one or the one or more multi-media content and sending an update message to the at least one local connection regarding the selection of the one or more multi-media content.

20. A tangible non-transitory computer readable medium storing one or more computer readable programs adapted to cause a processor based system to execute steps comprising:
initiating communication with a social networking server maintaining user information corresponding to a user, the user information for the user comprising media preferences for the user, one or more connections associated with the user, and media preferences for each of the one or more connections;

retrieving, at a first intermediary server, at least a portion of the user information for the user from the social networking server; and generating a viewing recommendation for the user at least in part based on at least one of the media preferences of the user, and the media preferences of the one or more connections, the viewing recommendation comprising one or more multi-media content;

facilitating a peer-to-peer connection between a first client device associated with the user and a second client device associated with one of the one or more connection for real-time communication between the first client device and the second client device;

wherein the generating of the viewing recommendation is further based on data received through the peer-to-peer connection;

wherein the first intermediary server maintains a lookup table of only a first set of client devices directly connected to the first intermediary server;

wherein the first intermediary server maintains an open communicational coupling to a second intermediary server which maintains a lookup table of only a second set of client devices connected to the second intermediary server, separate from the first set of client devices;

wherein the lookup table maintained on the first intermediary server allows the first intermediary server to send a message for a receiving client device directly to an intermediary server directly connected to the receiving client device; and wherein the first and second intermediary server each comprises a separate Application Programming Interface (API) module for communicating with the social networking server.

* * * * *